(12) United States Patent
Arkwright et al.

(10) Patent No.: US 7,340,730 B2
(45) Date of Patent: Mar. 4, 2008

(54) ON DEMAND, NETWORK ACCESSIBLE, RUN TIME COMPILE SERVER

(75) Inventors: Thomas D. Arkwright, Half Moon Bay, CA (US); Jacob Y. Levy, Los Altos, CA (US); Thomas E. Kirkley, San Jose, CA (US); Marc O. Ellwanger, San Francisco, CA (US); Kin-man Chung, Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 527 days.

(21) Appl. No.: 10/100,558

(22) Filed: Mar. 18, 2002

(65) Prior Publication Data

US 2003/0177480 A1    Sep. 18, 2003

(51) Int. Cl.
    G06F 9/45       (2006.01)
    G06F 15/16      (2006.01)
(52) U.S. Cl. .................... 717/148; 709/203
(58) Field of Classification Search ........... 717/166, 717/148, 145, 140, 173, 153; 712/212
    See application file for complete search history.

(56) References Cited

U.S. PATENT DOCUMENTS

| | | | |
|---|---|---|---|
| 5,848,274 A * | 12/1998 | Hamby et al. | 717/153 |
| 5,999,732 A * | 12/1999 | Bak et al. | 717/148 |
| 6,295,642 B1 * | 9/2001 | Blandy | 717/148 |
| 6,298,477 B1 * | 10/2001 | Kessler | 717/145 |
| 6,370,687 B1 * | 4/2002 | Shimura | 717/146 |
| 6,571,388 B1 * | 5/2003 | Venkatraman et al. | 717/166 |
| 6,721,804 B1 * | 4/2004 | Rubin et al. | 709/246 |

(Continued)

FOREIGN PATENT DOCUMENTS

EP    0 930 567 A2    7/1999

(Continued)

OTHER PUBLICATIONS

"Techniques for Obtaining High Performance in Java Programs", Iffat H. Kazi, Howard H. Chen, Berdenia Stanley, and David J. Lilja ACM Computing Surveys, vol. 32, No. 3, Sep. 2000, pp. 213-240.*

(Continued)

*Primary Examiner*—Wei Zhen
*Assistant Examiner*—Chih-Ching Chow
(74) *Attorney, Agent, or Firm*—Park, Vaughan & Fleming LLP

(57) ABSTRACT

A compile server and a class loader are disclosed. During execution of a program, the class loader transmits a compile service request and a run time service request, including a program instruction, over a network to a compile server. The class loader receives native machine code compiled from the instruction, where the native machine code is received over the network. Once received, the native machine code is executed. The compile server receives the compile service request and the run time service request, including the program instruction, over a network from the class loader, compiles the instruction into native machine code, and transmits the native machine code over the network to be executed. The compile server generates a compile thread for each compile service requests and processes multiple compile threads concurrently.

18 Claims, 15 Drawing Sheets

U.S. PATENT DOCUMENTS

| | | | |
|---|---|---|---|
| 2001/0042058 A1* | 11/2001 | Harrington et al. | 707/1 |
| 2003/0005425 A1 | 1/2003 | Zee | 717/166 |
| 2004/0015914 A1* | 1/2004 | Renouf | 717/148 |

FOREIGN PATENT DOCUMENTS

| | | |
|---|---|---|
| EP | 2000215181 | 4/2000 |
| EP | 1 104 898 A2 | 6/2001 |
| WO | WO 99/42925 | 8/1999 |
| WO | WO 03/032155 A2 | 4/2003 |

OTHER PUBLICATIONS

"Dynamic Typing for Distributed Programming in Polymorphic Languages", Dominic Duggan, ACM Transactions on Programming Languages and Systems, Jan. 19999, pp. 11-45.*

Glen McCluskey, "Remote Method Invocation: Creating Distributed Java-to-Java Applications", Oct. 1997, pp. 1-5, http://java.sun.com/developer/technicalArticles/RMI/CreatingApps/index.html.*

Dan Wallach, "JAVA Security", Oct. 27, 1999, pp. 1-19, http://www.cs.rice.edu/~dwallach/talks/java99.pdf.*

"Compiling multithreaded JAVA bytecode for distributed execution", Antoniu et al., Feb. 2000, pp. 1-12.*

Publication entitled "A Transportable Extendable Compiler," Victor R. Basili et al., Software-Practice and Experience, vol. 5, 1975, pp. 269-278.

Publication entitled "Threaded Code," James R. Bell, Communications of the ACM, Jun. 1973, vol. 16, No. 6.

Publication entitled "Macro Spitbol-a Snobol4 Compiler," Robert B.K. Dewar et al., Software-Practice and Experience, vol. 7, pp. 95-113, 1977.

Publication entitled "The Icon Analyst, In-Depth Coverage of the Icon Programming Language," Oct. 1991, No. 8.

Publication entitled "The Snobol4 Programming Language," by R. E Griswold et al., Bell Telephone Laboratories, 1968.

* cited by examiner

```
public class Batman {
        public static void main(String[] args) {
                System.out.println("BATMAN: I am BATMAN!");
                If (args != null) {
                        If (args.length == 1) quote(args[0]);
                }
                else quote("Robin");
        }
public static void quote(String className) {
        try {
                Class c = Class.forName(className);
                Object o = c.newInstance();
                Method m = c.getMethod("quote", null);
                m.invoke(o, null);
        }
        catch (Exception e) {System.out.println(e); }
}
}
```

Fig. 15

```
public class Robin
        public static void main(String args[]) {
                quote();
        } public static void quote() {
                system.out.println("ROBIN: I am Robin!");
                Alfred.quote();
        }
}
```

Fig. 16

```
public class Alfred {
        public static void main(String args[]) {
                quote();
        }
        public static void quote() {
                System.out.println("ALFRED: Yes, Master Bruce!");
        }
}
```

Fig. 17

ON DEMAND, NETWORK ACCESSIBLE, RUN TIME COMPILE SERVER

BACKGROUND OF THE INVENTION

1. Field of the Invention

The present invention relates to compilers. More specifically, to the compilation of software during run time.

2. Description of the Related Art

The JAVA™ programming language is a general-purpose, object-oriented programming language developed by Sun Microsystems. JAVA™ is a trademark or a registered trademark of Sun Microsystems, Inc. in the United States and other countries. It is designed to provide secure delivery of software components across multiple host architectures and to be portable enough to be executed on devices ranging from personal devices (e.g., pagers, cell phones, and smart cards) to supercomputers.

To execute a program written in the Java™ programming language, the program source file is compiled and a class file, containing virtual machine instructions, is produced. The class file is then executed by a Java™ Virtual Machine (hereinafter JVM). In general, the JVM is an interpreter that decodes and executes the virtual machine instructions contained in the class file. These virtual machine instructions are referred to as bytecodes. In addition to the bytecodes, the class file includes other information utilized and/or operated on by the JVM. For example, the class file includes a number to identify the class file format and a constant pool table to identify constants that are referenced within the class file.

The Java™ programming language is an interpreted language. Generally, an interpreted language is a language in which programs are translated and executed one statement at a time. As an example, in the Java™ environment, the virtual machine instructions contained in a class file are interpreted by the JVM, translated on-the-fly into native machine code, and then executed.

A disadvantage of interpretive languages involves speed of execution. Being interpreted, the Java™ programming language can be slower than other languages implemented with compilers when each is executing the same algorithms. However, as an interpreted language, the Java™ language is able to provide a more flexible run time environment in which classes and dynamic constructs contained in the Java™ programming language can be dynamically resolved. The term "run time" refers to the time during which a program is running or executing. This is not to be confused with the term "runtime", which refers to an engine that provides services to an application during run time. For example, the Java™ Runtime Environment (JRE) refers to the smallest set of executables and files that constitute the standard Java™ platform. The term "dynamic constructs" refers to those constructs in the Java™ programming language that allow new source code to be added to the program during execution, and to be executed on-the-fly, without user intervention. The methods ClassLoader.defineClass and Class.forName are examples of dynamic constructs utilized in the Java™ programming language. With dynamic constructs, a lexical production composed dynamically by the program is able to vary with state. Contrast this with compiled languages, which must execute from a static, generally immutable, pre-determined expression called a load module (a load module is, for example, the a.out file or .exe file seen on various platforms). Compiled languages typically lack dynamic constructs and thus lack the dynamic features provided by the Java™ programming language.

Thus, it is desirable that the Java™ programming language be compiled rather than interpreted. However, the Java™ language contains dynamic constructs at odds with the nondynamic (static) character of compiled programs. For example, because dynamic constructs can operate on information known only during run time, traditional compilation of dynamic constructs can result in an incorrect result or unexpected failure, during compilation and/or run time. Because of the challenges that exist in providing a conforming Java™ compiler which supports the dynamic nature of the Java™ language, the Java™ language has never been implemented entirely as a compiled language.

Thus, a need has been felt for a method and apparatus that allows for run time compilation of Java™ software that requires run time information.

SUMMARY OF THE INVENTION

In one embodiment of the present invention, a method of run time compilation is disclosed. The method includes receiving an instruction from a network and compiling the instruction into native machine code.

In another embodiment of the present invention, a method of run time compilation is disclosed. The method includes transmitting an instruction to a network and receiving native machine code compiled from the instruction from the network.

In still another embodiment of the present invention, a compile server for compiling instructions at run time is disclosed. The compile server includes an instruction receiver configured to receive an instruction from a network, a compiler configured to compile the instruction into native machine code, and a code transmitter configured to transmit the native machine code to the network.

In yet another embodiment of the present invention, a computer system is disclosed. The computer system includes a processor, a memory, which includes a program and an instruction, an instruction transmitter configured to transmit the instruction to a network, and a code receiver configured to receive native machine code compiled from the instruction from the network.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

FIG. 15 illustrates a listing of Java™ class file containing a dynamic construct that requires information not available at compile time.

FIGS. 16 and 17 illustrate dependencies among Java™ source code files according to one embodiment of the present invention.

The use of the same reference symbols in different drawings indicates similar or identical items.

DETAILED DESCRIPTION

The following is intended to provide a detailed description of a specific embodiment of the invention. An example of this embodiment is illustrated in the accompanying drawings. While the invention will be described in conjunction with a specific embodiment, it will be understood that it is not intended to limit the invention to one embodiment. To the contrary, it is intended to cover alternatives, modifications, and equivalents as may be included within the scope of the invention as defined by the appended claims.

Introduction

In general, embodiments of the present invention provide innovative techniques for compiling dynamic constructs of the Java™ programming language into native machine instructions for faster execution on a specific architecture. Compilation, as referred to herein, is a transformation that uses bytecodes as input and produces as output native machine instructions for a particular instruction set architecture.

Figure 1:
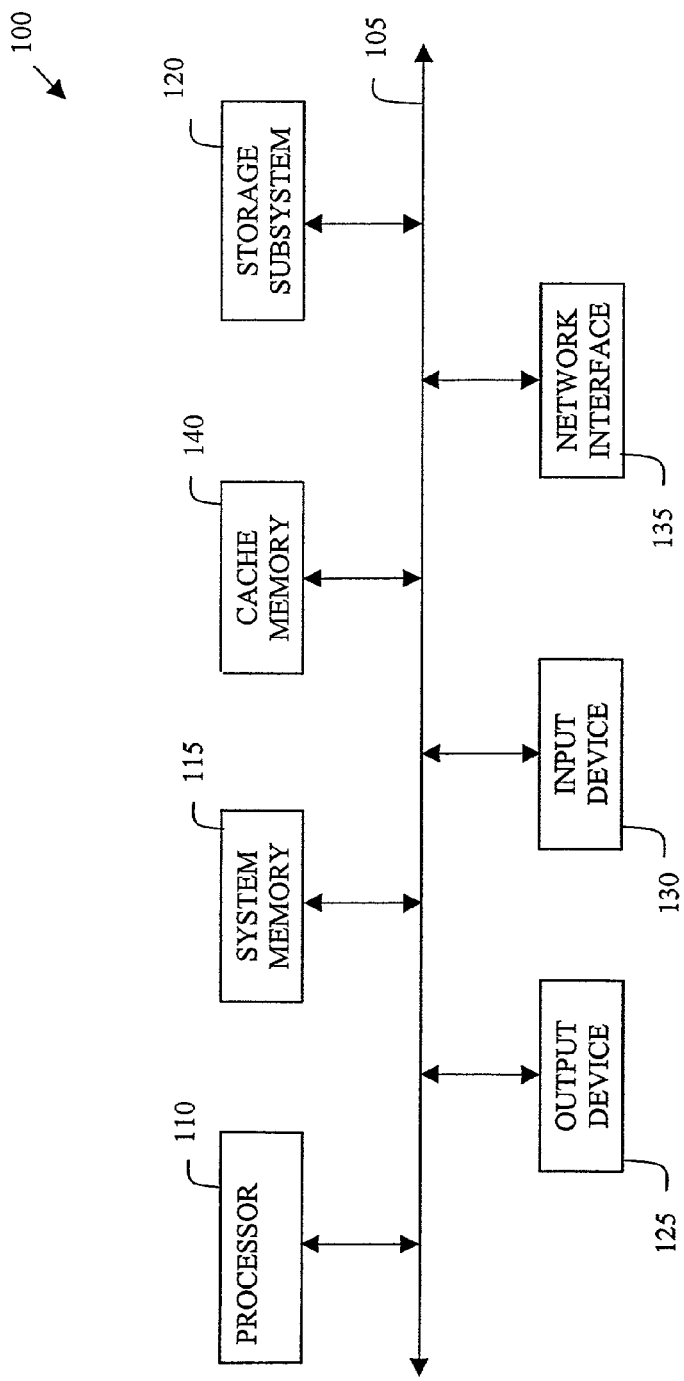
FIG. 1 illustrates a block diagram of a system used to carry out the instructions of an embodiment of the present invention.

FIG. 1 illustrates a block diagram of a system used to carry out the instructions of an embodiment of the invention. FIG. 1 shows a system 100, which includes a system bus architecture 105 connected to a processor 110. System bus architecture 105 is illustrative of any interconnection scheme serving to connect the subsystems. For example, a local bus could be utilized to connect the processor to the system memory and network interface. Processor 110 can be any processor capable of executing instructions from an instruction set architecture and communicating with the subsystems shown in FIG. 1. In one embodiment of the present invention, processor 110 is a processor capable of executing instructions from Sun's SPARC™ II or SPARC™ III instruction set architecture.

System 100 further includes a system memory 115, a storage subsystem 120, and an output device 125. System memory 115 may include dynamic random access memory (DRAM), although any type of system memory may be used. Storage subsystem 120 can be a hard disk drive, a floppy diskette drive, a read/write CD-ROM drive, flash memory, and/or other storage subsystem. Examples of output device 125 include a monitor, speakers, a printer, writable media such as a floppy diskette or CD-ROM, or other output device. System 100 also includes an input device 130, a network interface 135, and a cache memory 140. Examples of input device 130 include a keyboard, a mouse, a microphone, a touch-screen, a tablet, or other input device. Additionally, network interface 135 can function as an input and/or output device whereby data is receive and/or transmitted by system 100. Cache memory 140 can be any size and capacity cache memory, and may or may not be integrated with processor 110. Other systems suitable for use with the present invention may include additional or fewer subsystems. For example, another system could include more than one processor 110 (i.e. a multi-processor system) or implement cache memory 140 in system memory 115 or storage system 120.

Figure 2:
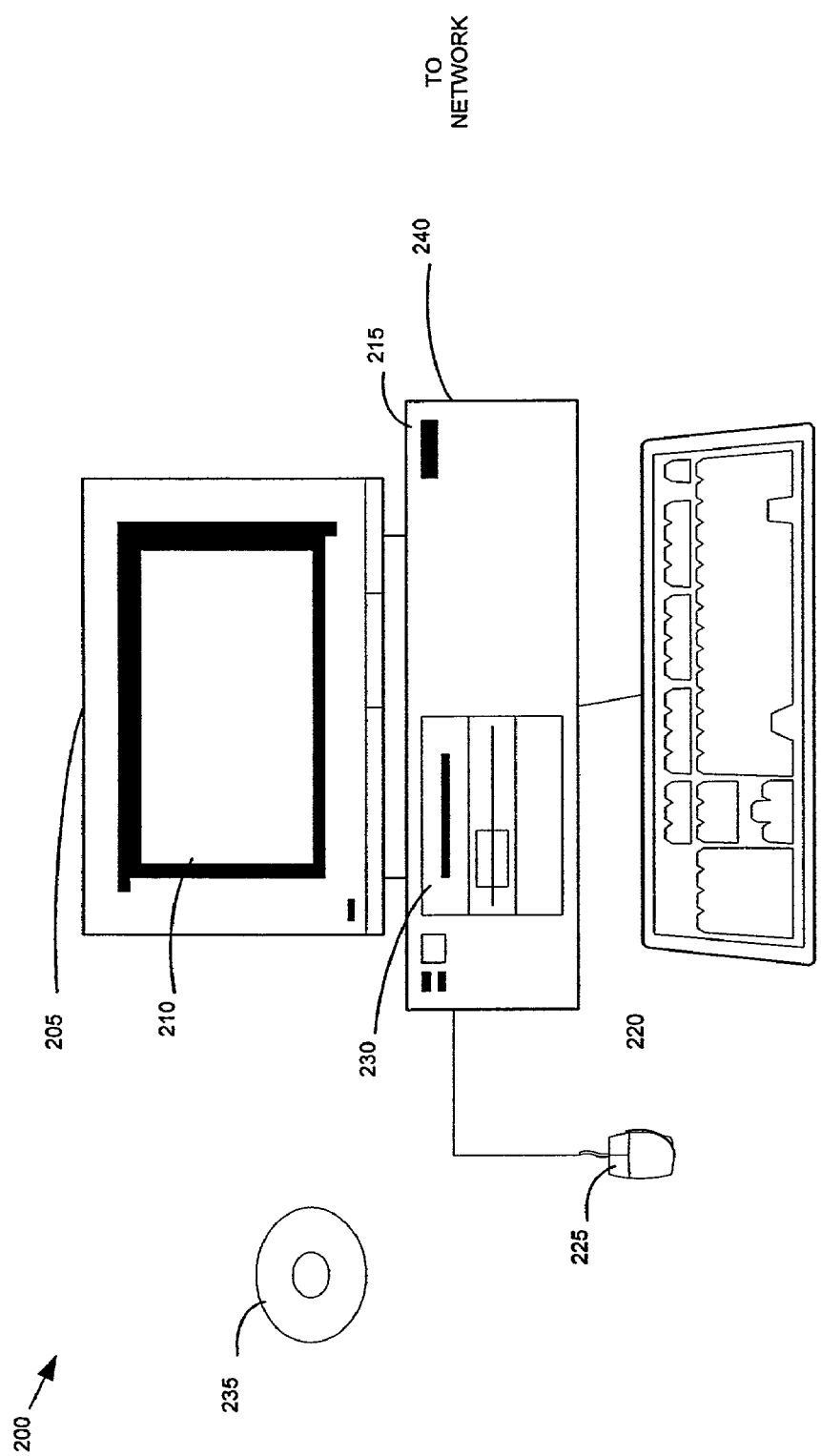
FIG. 2 depicts an exemplary system capable of supporting a compile server according to one embodiment of the present invention.

FIG. 2 depicts an example of system 100 which may be used to carry out the instructions of an embodiment of the invention. FIG. 2 shows a computer system 200 that includes a display 205, a screen 210, computer housing 215, a computer housing 215, a keyboard 220, and a mouse 225. Computer housing 215 includes a CD-ROM drive 230, a processor (not shown), system memory (not shown), storage subsystem (not shown), system bus architecture (not shown), and network interface (not shown). Computer housing 215 may house circuitry that implements embodiments of the invention and data to be used by the same. CD-ROM drive 230, system memory, and the storage subsystem may be utilized to store and retrieve software incorporating computer code that implements embodiments of the invention. For example, CD-ROM drive 230 can utilize, store, and retrieve such computer code on a CD-ROM 235. Although CD-ROM 230 is shown as an exemplary computer readable storage medium, other computer readable storage media including floppy disk, tape, flash memory, system memory and hard drive may be utilized. Additionally, a data signal embodied in a network may be the computer readable storage medium. Computer system 200 is connected to a network via network interface and a network connection 240. Network connection 240 represents either a physical, wireless, or other network connection.

Figure 3:
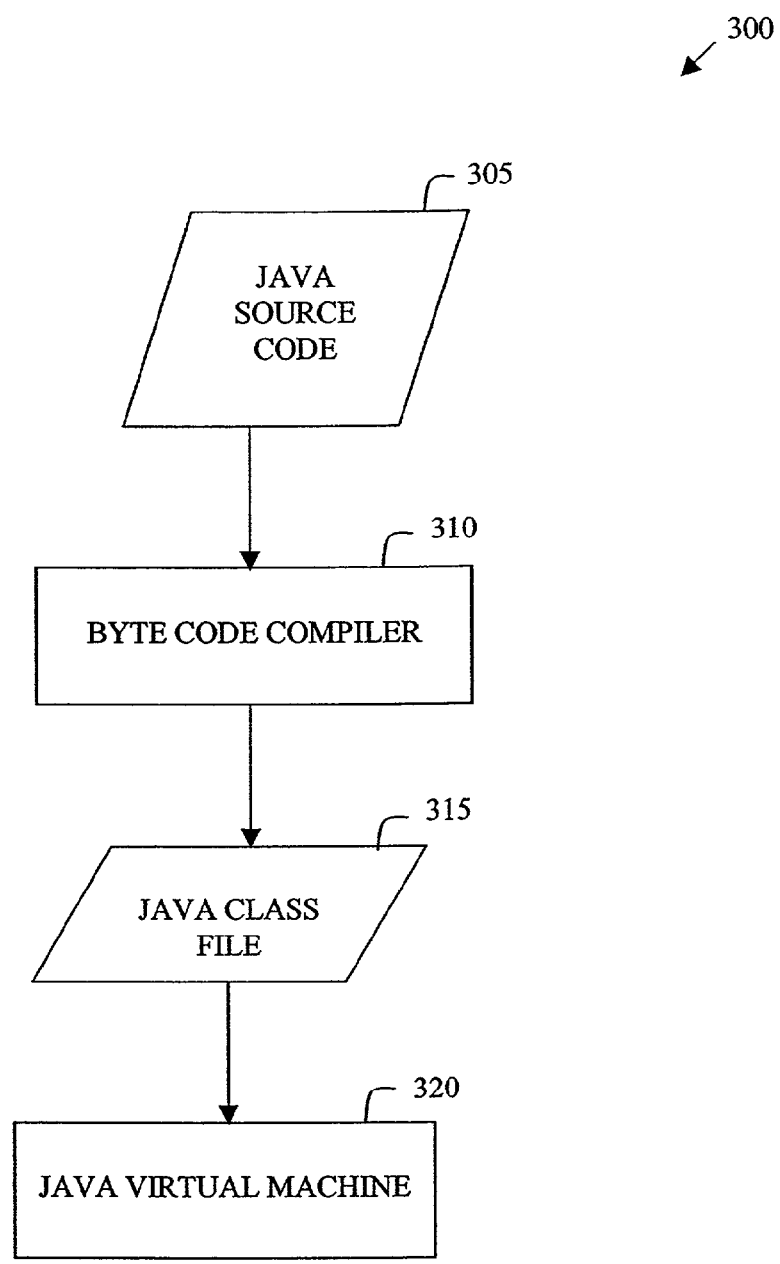
FIG. 3 illustrates the handling of inputs and outputs for a system according to one embodiment of the present invention.

FIG. 3 depicts a block diagram showing the inputs, outputs, and systems involved in creating native machine instructions from source code written in the Java™ programming language (Java™ source code) in accordance with one embodiment of the present invention. Java™ source code 305 is input into a bytecode compiler 310 that compiles the source code into bytecodes. Bytecodes are virtual machine instructions capable of execution by the JVM, essentially a software emulated computer. Virtual machine instructions are generic, i.e., not designed for any specific microprocessor or computer architecture. Bytecode compiler 310 outputs class file 315 that includes the bytecodes produced from the Java™ source code. Class file 315 is portable and can be executed on any computer that has implemented a JVM. Class file 315 is input into Java™ Virtual Machine 320. Java™ virtual machine 320 decodes and executes the bytecodes of class file 315.

Classes (and interfaces) within the Java™ programming language may be dynamically loaded, linked and initialized. Loading is the process performed by the system in finding the binary form of the class (e.g., the class file) and constructing an object to represent the class. Linking is the process of combining the binary form of the class into the runtime state of the system so that the class may be executed. Initialization of a class includes executing the class' static initializers and initializers for static fields declared in the class.

Associated with each class is a constant pool. The constant pool is stored in the class file and maintains representations of the constants which are referred to within a class file. Typically, each entry in the constant pool is indexed by a number starting with "1" and going up to the number of entries in the constant pool. A method for a class accesses entries in the constant pool by the index. A method for one class may not access a constant pool for another class.

The Java™ programming language provides the ability to dynamically load classes which require information nor available at the time the class is loaded (e.g. the information is only available after the program which contains the class is executed). Dynamic loading of classes at run time provides flexibility in the development of Java™ systems, systems which are designed to execute programs written in the Java™ programming language. The dynamic loading of classes allows programmers to build Java™ systems that can be modified and continually developed without the need for re-compilation. For example, during run time, a Java™ method may access (for either reading or writing) fields of a class that have not yet been loaded. The dynamic loading of classes allows the program to be re-executed without the need for re-compilation each time the fields of a class are modified.

Within the Java™ language dynamic loading is typically accomplished with certain methods in the Java™ programming language. Examples of methods which may be used to dynamically load classes includes the define class method on the class java.lang.ClassLoader, and the Class.forName method. The define class method allows developers to create a new class type at run time. With the define class method, a class can be dynamically created and loaded knowing only a corresponding superclass or interface, the details of the class are not required.

Furthermore, embodiments of the present invention support compilation of closed and open applications. An application is closed if all classes are available at compile time and the application does not dynamically load classes over a network. An application is said to be open if there are classes not available at compile time and/or the application dynamically loads classes (e.g. over a network).

An Exemplary Compile Server

Figure 4:
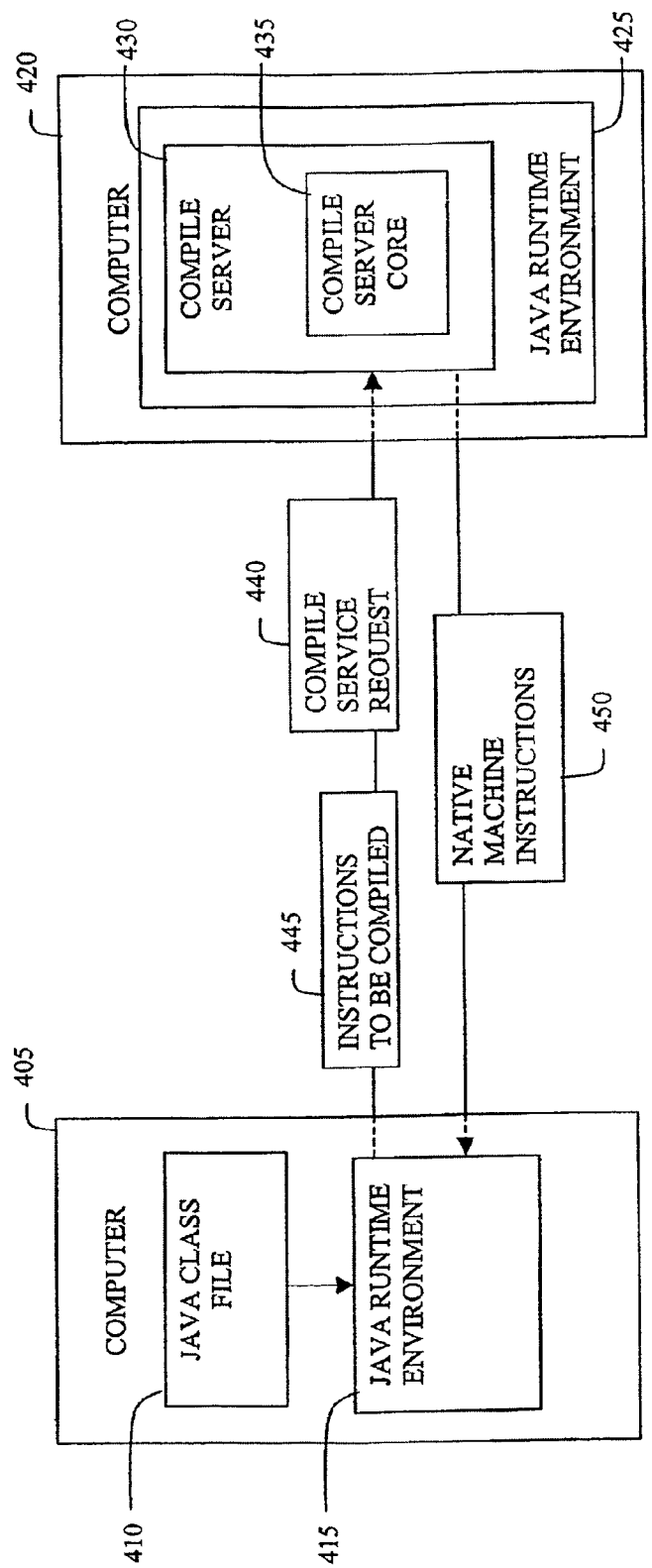
FIG. 4 illustrates a computer in communication with a compile server over a network for compiling and executing Java™ source code according to one embodiment of the present invention.

FIG. 4 illustrates a computer in communication over a network with another computer including a compile server for run time compilation of Java™ source code in accordance with one embodiment of the present invention. A computer 405 includes a Java™ class file 410 and a Java™ runtime environment 415. As described above, a Java™ class file contains bytecodes produced when a Java™ source program has been compiled by a bytecode compiler compatible with the Java™ programming language. Java™ class file 410 is input into Java™ runtime environment 415 for compilation and execution.

Computer 420 includes Java™ runtime environment 425 which further includes compile server application 430 and compile server core 435. In one embodiment, Java™ runtime environment 425 is similar to Java™ runtime environment 415. In another embodiment, Java™ runtime environment 415 does not include compile server 430, but is otherwise similar to Java™ runtime environment 425. Compiler server 430 can run under a native Java™ runtime environment and can dynamically create a new class with, for example, the define class method. FIG. 4 also illustrates that compile server 430 is an additional class of Java™ runtime environment 425.

Computer 405 and computer 420 are connected, via a network for example, such that computer 405 can communicate with computer 420, and vice versa. Upon detection of dynamic constructs within Java™ class file 410, Java™ runtime environment 415 transmits a compile service request 440 and instructions to be compiled 445 to computer 420 for compile server 430. Examples of compile service request 440 include, for example, a compile command, a command provided within a wrapper class for Java™ runtime environment 415 or Java™ runtime environment 425, a file, or other command or method to indicate to compile server 430 and compile server core 435 that a compilation is to be performed. Additionally, compile service request 440 may be integrated with instructions to be compiled 445. Compile server 430 receives compile service request 440 and instructions to be compiled 445 during run time. Compile server 430 compiles instructions to be compiled 445 into native machine instructions 450 and transmits native machine instructions 450 to computer 405 for execution by Java™ runtime environment 425.

Thus, during run time execution of a program on computer 405, compile server 430 provides for, among other things, the receipt and compilation of instructions from computer 405, or any computer connected to computer 420 requiring run time compilation of instructions, and transmits the compiled instructions to computer 405, or to any computer requiring run time compilation. Java™ runtime environment 425, along with compile server 430, provide a way to translate Java™ class file 410 into native machine instructions for execution, without the need for interpretation. Additionally, Java™ runtime environment 425 implements a native Java™ compiler runtime environment in conformance with Java™ specification, for example Java™ specification 1.3 or later. The term "native machine instructions" or "native machine code" refers to instructions which are specific to a particular machine or processor. Additionally, the native machine instructions produced by compiler server 430 satisfy test suites, specifically the Java™ Compatibility Kit used to evaluate the overall compatibility of code in view of Java™ specifications. A more detailed description of the steps performed by compile server 430 is provided subsequently.

Figure 5:
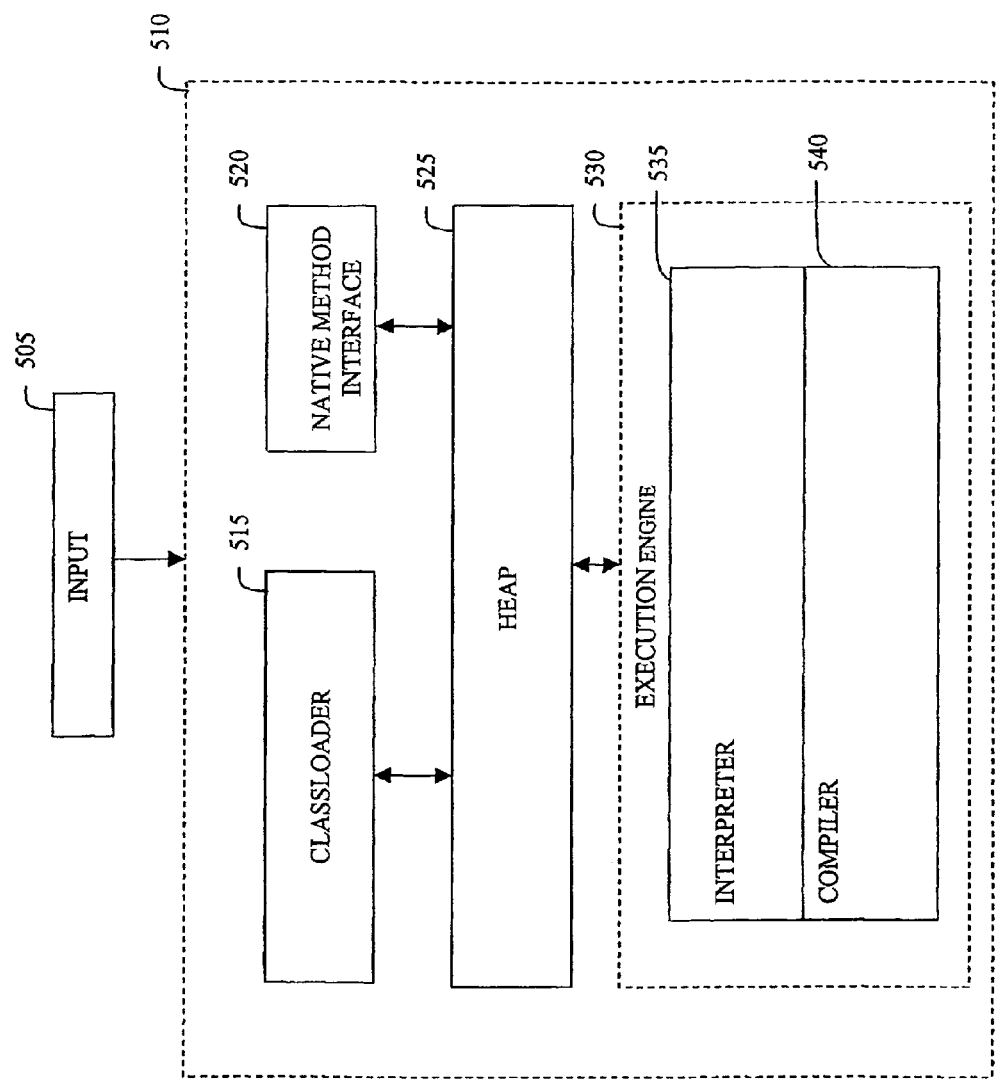
FIG. 5 illustrates the components of an implementation of a Java™ runtime system according to one embodiment of the present invention.

FIG. 5 illustrates the components of an implementation of a Java™ runtime system in accordance with an embodiment of the present invention. Implementations of the Java™ virtual machine are known as Java™ runtime systems. As described above, the term "runtime" refers to an engine that provides services to an application during run time, and the term "run time" refers to the time during which a program is running or executing. Input file 505 is input into Java™ runtime system 510. Input file 505 may be a Java™ class file, standard built-in Java™ classes, and/or native methods. Java™ runtime system 510 includes a classloader 515, a native method interface 520, a heap 525, and an execution engine 530. Classloader 515, described subsequently in FIG. 7, loads Java™ class files in connection with an embodiment of the present invention. Native method interface 520 links in native methods into Java™ runtime system 510 and heap 525 provides storage space for objects.

Execution engine 530 further includes an interpreter 535 and a compiler 540. Execution engine 530 carries out instructions contained in heap 525 and can be implemented in software, hardware or a combination of the two. Execution engine 530 supports object-oriented applications and there may be multiple execution engines running concurrently, one for each Java™ thread, as illustrated below with reference to FIG. 6.

Figure 6:
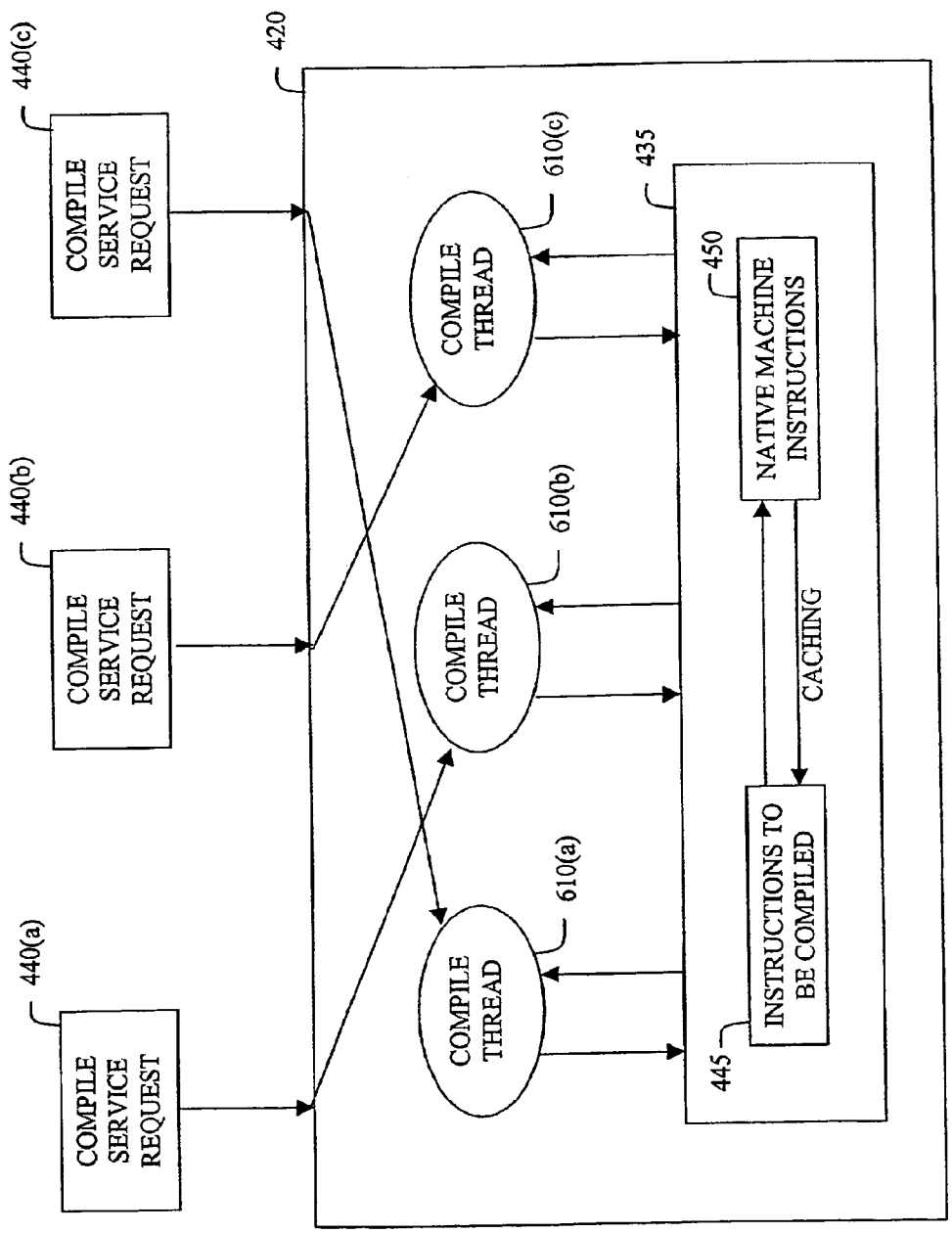
FIG. 6 illustrates the multi-threading capabilities of an implementation of a compile server according to one embodiment of the present invention.

FIG. 6 illustrates the multi-threading capabilities of an implementation of a compile server in accordance with embodiments of the present invention. Compile service requests 440(a), 440(b), and 440(c) are received by computer 420. For each compile service request 440, a compile thread 610 is generated (exemplified as compile threads 610(a), 610(b), and 610(c), respectively). Compile server 430 is multi-threaded and is capable of concurrently executing the native compilation activity which translates bytecode instructions to be compiled 445 into native machine instructions 450. Compile server core 435 processes a compile thread and compiles instructions to be compiled 445 into native machine instructions 450. Caching is used in connection with the processing of multiple threads. For example, in addition to supporting computer 420, caching may also be provided for multiple computers requiring multiple compile requests. A more detailed description of the overall process of such compilation is described with reference to the figures below.

Figure 7:
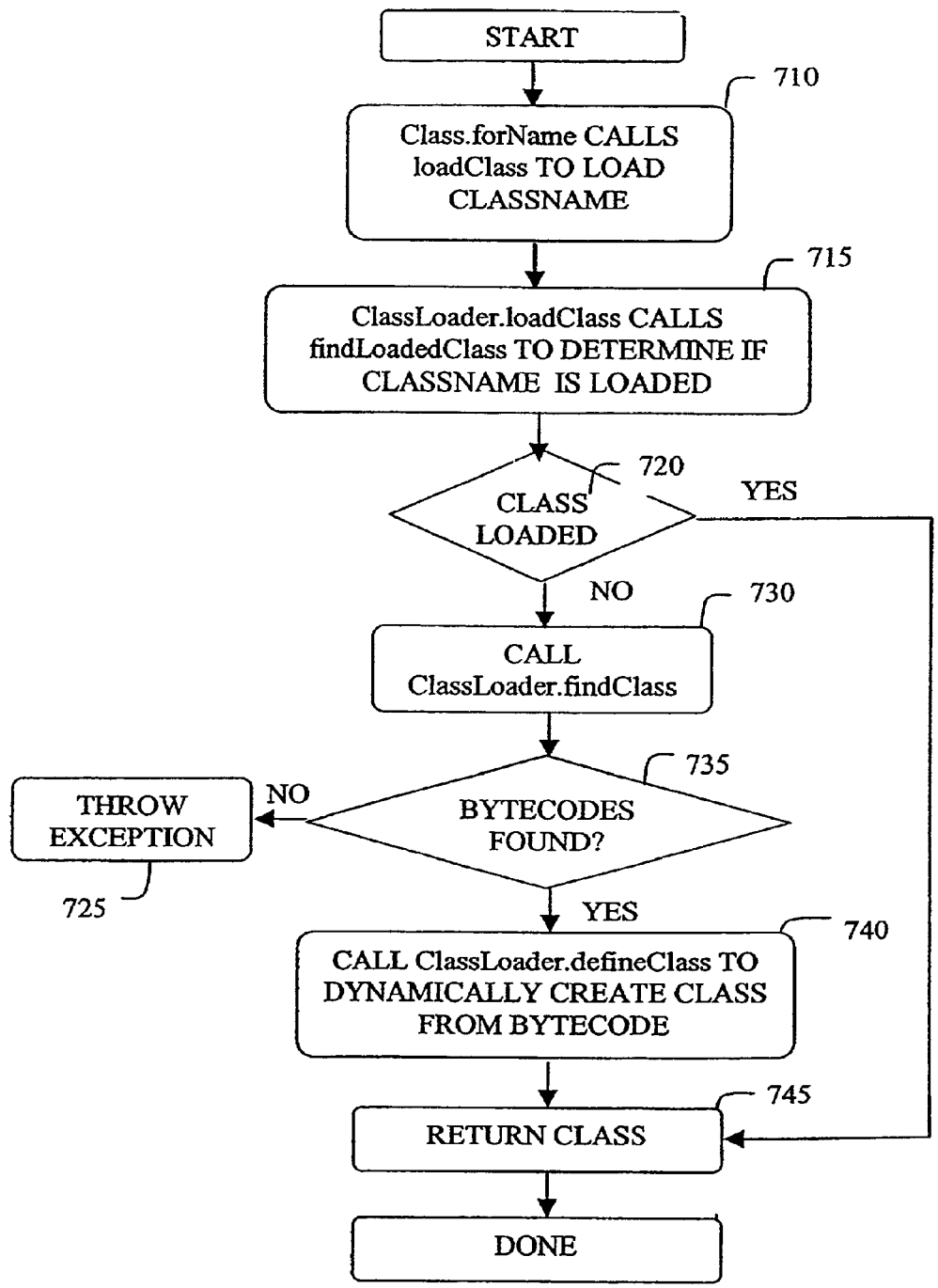
FIG. 7 illustrates tasks generally performed by a class-loader according to one embodiment of the present invention.

FIG. 7 depicts a flow chart illustrating the tasks performed by a ClassLoader in the loading of dynamic classes according to an ebodiment of the Invention. As described above, a Classloader is used create a binary representation for a given class, including a dynamic class. Initially, when ClassLoader is used to load a class, ClassLoader invokes the method Class.forName. Those familiar with the Java™ programming language will recognize that the term "method" refers generally to a body of executable code. When the Class.forName method is invoked, Class.forName calls the loadclass method and passes to the loadclass method the classname to load (step 710). The ClassLoader.loadClass method in turn, calls the findLoadedGiass method, and provides the classname to the findLoadedGlass method in order to determine if the class identified by classname is already loaded (step 715), The ClassLoader.findLoadedClass method look in a loaders registry to determine if the class is already loaded (step 720). If the class is already loaded, the ClassLoader.tindLoadedClass method will return the class (done in step 745). Otherwise, if the class is not already loaded, the ClassLoader.loadClass method calls the findclass method to load the class, passing to the findclass method the classname (step 730). The ClassLoader.findClass method attempts to find the bytecodes for classname, for example via a search through the accessible filesystem and/or the over the network (step 735). If the bytecodes are not located, a class not found exception is thrown (step 725). If the bytecodes are located, the ClassLoader.findClass method calls the ClassLoader.defineClass method and passes to the ClassLoader.define class method the classname and the located bytecodes, to dynamically create a new class (step 740). Following this, the class is returned (step 745).

The operations referred to herein may be modules or portions of modules (e.g., software, firmware or hardware modules). For example, although the described embodiment includes software modules and/or includes manually entered user commands, the various exemplary modules may be application specific hardware modules. The software modules discussed herein may include script, batch or other executable files, or combinations and/or portions of such files. The software modules may include a computer program or subroutines thereof encoded on computer-readable media.

Additionally, the boundaries between modules are merely illustrative and alternative embodiments may merge modules or impose an alternative decomposition of functionality of modules. For example, the modules discussed herein may be decomposed into submodules to be executed as multiple computer processes. Moreover, alternative embodiments may combine multiple instances of a particular module or submodule. Furthermore, the operations described in exemplary embodiment are for illustration only. Operations may be combined or the functionality of the operations may be distributed in additional operations in accordance with the present invention.

Figure 8:
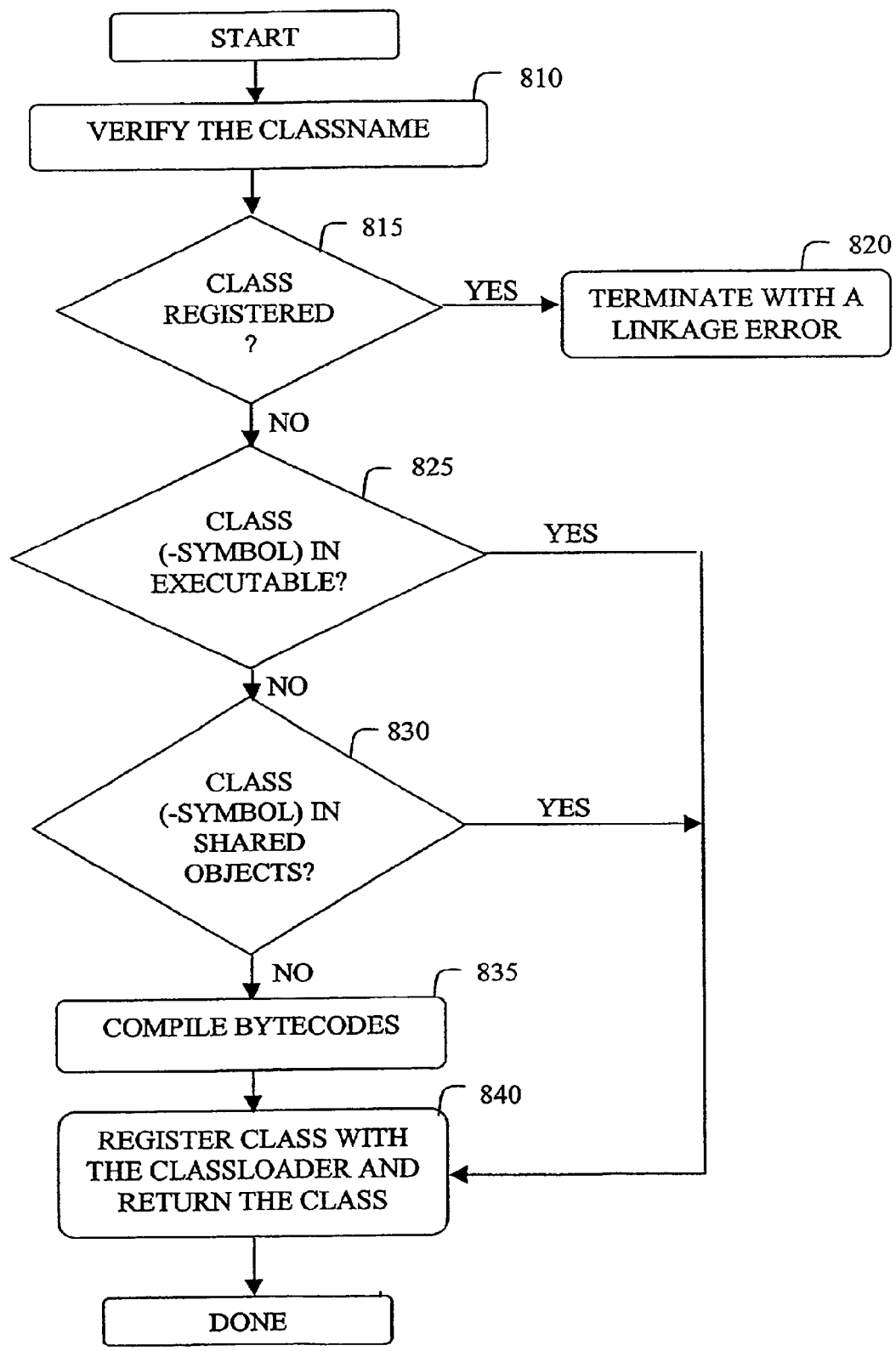
FIG. 8 illustrates general tasks performed by the ClassLoader.defineClass method according to one embodiment of the present invention.

FIG. 8 is a flow diagram illustrating generally the tasks performed by the method define class in the loading of dynamic classes in accordance with the present invention. Initially, the define class method verifies the provided classname by examining the bytecodes and classname provided to the define class method by the ClassLoader.findClass method (step 810). Once verified, the define class method determines whether or not the class is defined (step 815). If, under the provided classloader, classname is already defined, the method terminates with a linkage error (step 820). Otherwise, the method examines the executable to determine if the class(-symbol) is present (step 825). If the class(-symbol) is present, the class is registered with the provided classloader and the class is returned (step 840). In step 830, the method looks into shared objects (not yet loaded) in the library path associated with the classloader to determine if the class(-symbol) is present. This utilizes the caching as described subsequently with reference to FIG. 11. If the class is present, the class is registered with the classloader, and returned (step 840). If the class cannot be located by the above-described steps, the define class method uses an instance of the runtime component compile-server-wrapper class to call the associated compile method and the bytecodes are compiled by compile server 430 (step 835). A class is then provided which is registered with the classloader and the class is returned (step 840). A more detailed description of the bytecode compilation is provided with reference to the figures FIG. 10-FIG. 12.

Initialization of an Exemplary Compile Server

Figure 9:
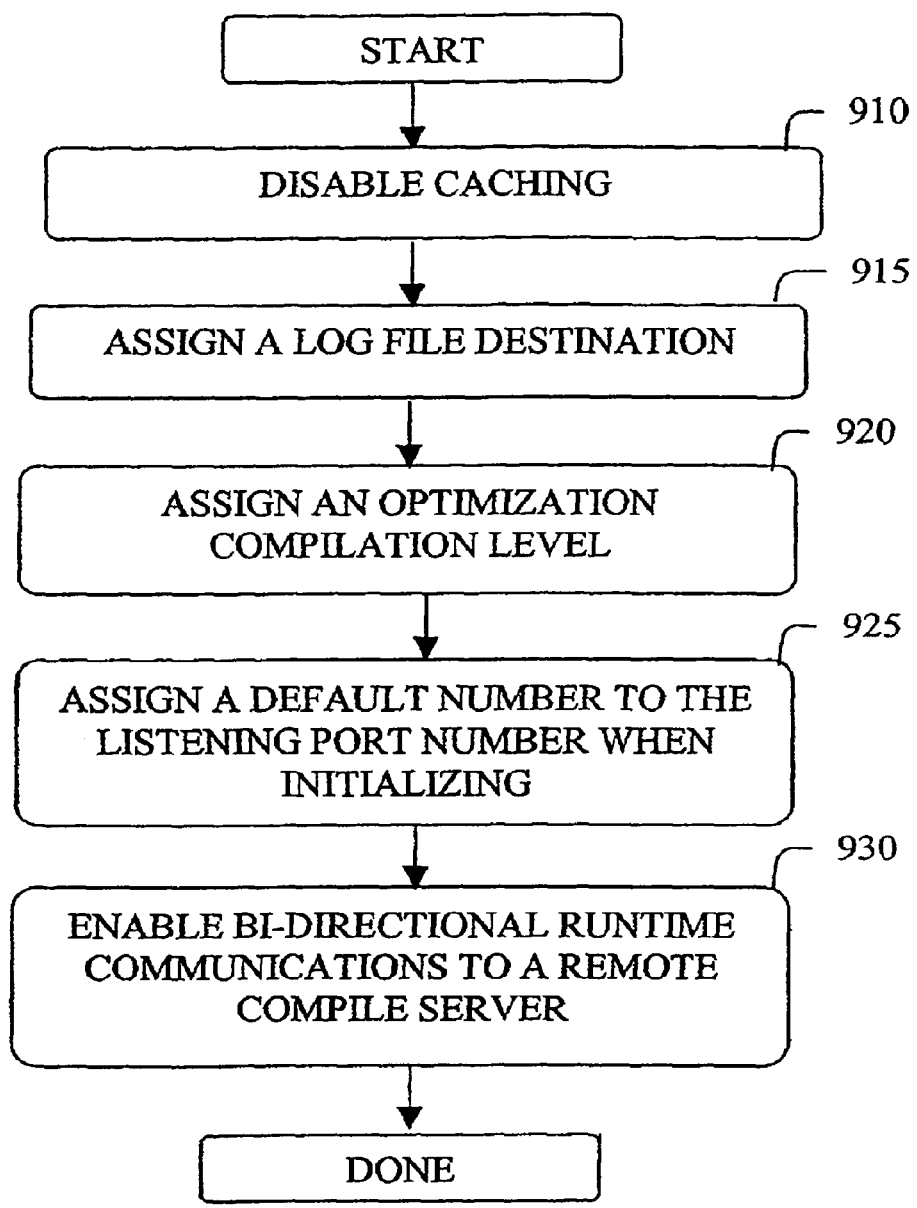
FIG. 9 illustrates general tasks performed for initializing compile server 430.

FIG. 9 is a flow diagram illustrating generally the tasks performed to initialize the functionality of compile server 430. When performing the initialization sequence, compile server 430 disables caching (step 910). Next, a log file destination is assigned (step 915). The log file provides information concerning the compilation process. For example, the Log file may contain a chronology of events which took place detailing the compilation process. This is helpful not only in ensuring that the compilation was successful, but in pinpointing any errors which might have occurred during the process. In optimizing the compilation process, an optimization compilation level is assigned (step 920). The conventional optimization provides for increased efficiency in the overall execution of native machine instructions (produced from the compiled bytecodes). To provide networking connectivity, a default number is assigned to the listening port number and bi-directional run time communications are enabled (steps 925 and 930, respectively). This provides for networked communication between computers 405 and 420 and enables the native compilation of bytecodes introduced at run time into computer 405 to occur on computer 420 during run time execution of the bytecodes. To keep Java™ runtime environment 425 and compiler server 430 from interfering with each other as they evolve, a compile server wrapper class is provided in Java™ runtime environment 425 to encapsulate the capabilities of compile server 430. In general, a wrapper class provides methods and variables related to a given method, function, class or body of code. By using a wrapper class, efficiency in accessing the methods and variables is increased. The wrapper class associated with embodiments of the present invention provides methods and variables related to the capabilities of compile server 430.

Figure 10:
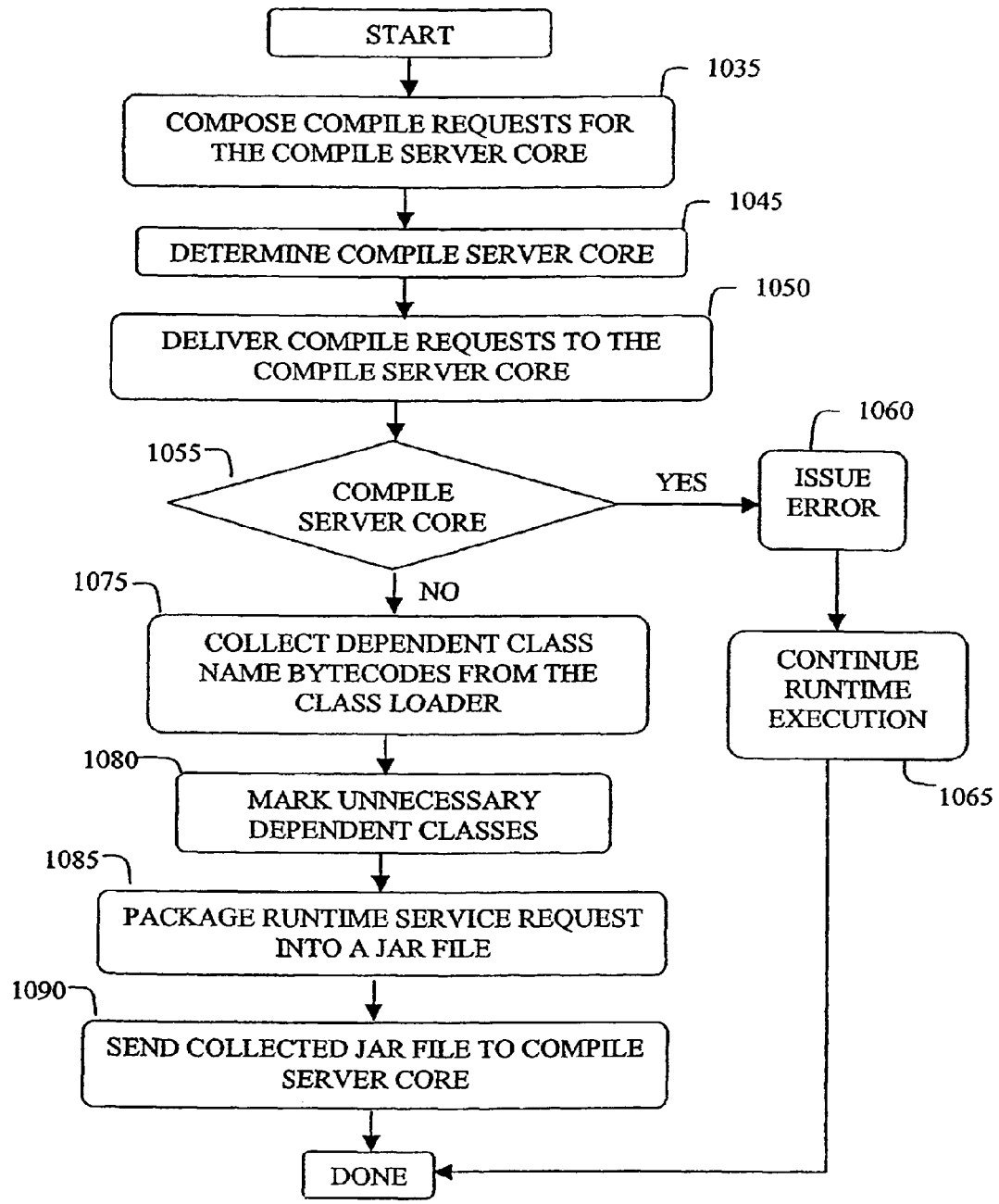
FIG. 10 illustrates the steps taken by Java™ runtime environment according to one embodiment of the present invention.

FIG. 10 illustrates the steps taken by Java™ runtime environment 425 in accordance with embodiments of the present invention. Generally, Java™ runtime environment 425 performs checks on the bytecodes in Java™ class file 410 to detect dynamic constructs that cannot be resolved at compile time, as represented in FIG. 15 (where the argument className is a variable). During execution of a Java™ program, for example Java™ class file 410, control passes to the compile server wrapper class for communication with compile server 430 upon the detection of dynamic constructs. The encapsulated functionality in this wrapper class exports the necessary requests and data to compile server 430 as shown in FIG. 4.

Continuing with FIG. 10, a compile service request (exemplified in FIG. 4 as compile service request 440) is composed in the encapsulating wrapper class (step 1035). Compile service request 440 notifies compile server 430 of the need to perform a compilation. Because compile server 430 is multithreaded and capable of processing multiple compilations concurrently, the overall efficiency of the compilation and execution of bytecodes in class file 410 is increased. Additionally, any data to be compiled can be compiled during run time. For example, during the execution of bytecodes in Java™ class file 410, compile server 430 may receive a compilation service request for a variable for the ClassLoader.defineClass method, the request being sent before the data is needed for execution, but also sent during run time. Compile server 430 may process the compilation of the bytecodes of the variable concurrently as Java™ class file 410 is being executed on computer 405 and return the necessary binary data in time for the data to be used during execution. A detailed description of the function of the compile server appears below with reference to FIG. 11.

Continuing with FIG. 10, steps 1045 through 1090 describe generally the tasks performed should a native Java™ static executable redirect processing dynamically at run time to the dynamic class creation service provided by compile server 430. Java™ runtime environment 425 determines the availability of compile server core 435 and delivers compile service request 440 (steps 1045 and 1050, respectively). Compile server core 435 performs direct compilation of bytecodes to native machine instructions. Should there be an error accessing compile server core 435, as illustrated by decision block 1055, Java™ runtime environment 425 issues an error and execution continues (steps 1060 and 1065, respectively), if access to compile server core 435 is successful, dynamic classes in the respective scope are scanned by classloader 515 of Java™ runtime environment 425, and dependent class name bytecodes are collected (step 1075). The dependent class names are names of those classes which depend, or are otherwise related, to a dynamic construct. In collecting all dependent 15 classes, there is no need for interpretation in the executing Java™ runtime environment 425, since compile server 430 externally provides compilation of all bytecodes from any Java™ runtime environment in the runtime environment into native machine instructions, including compilation of dynamic constructs utilizing information that may not be known until run time.

For efficiency, classes are marked ignored if the object code of a class is already known to Java™ runtime environment 425 at the time compile service request 440 is composed (step 1080). These ignored classes are needed by the compile server core 435 to accomplish compilation, though their object code is already known to Java™ runtime environment 425. In reducing the number of classes to be returned to Java™ runtime environment 425 as object code, delays are reduced, thus achieving greater overall efficiency in the execution of computer program of class file 410. The collected bytecodes, including those of the ignored classes, are packaged in a file according to the Java™ Archive file format (JAR) by Java™ runtime environment 415 and exported to computer 420 for compile server 430 (steps 1085 and 1090, respectively). The JAR format enables the bundling of multiple tiles into a single archive file referred to as a JAR file. In addition to a JAR file, any other functionally equivalent file package may be used to export the data to computer 420. For example, the data may be compressed before export by Java™ runtime environment 415, and uncompressed by compile server 430 upon receipt. Alternatively, the data may be appended into a file by Java™ runtime environment 415 and then exported to compiler server 430.

Operation of an Exemplary Compile Server

Figure 11:
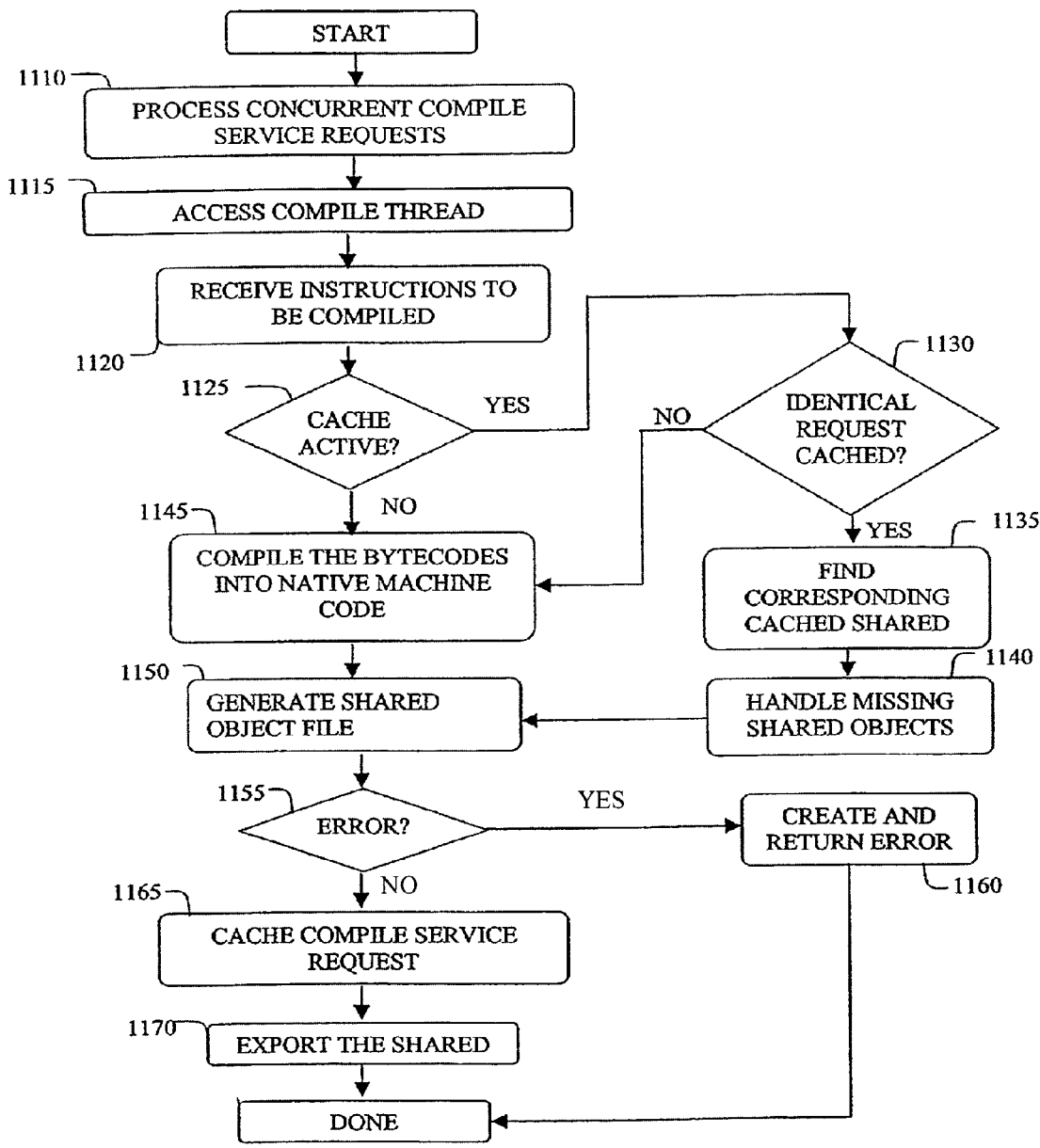
FIG. 11 illustrates the steps performed by compile server 430 of FIG. 4 according to one embodiment of the present invention.

FIG. 11 illustrates the steps performed by compile server 430 in compiling instructions to be compiled 445. Compile server 430 is capable of concurrently processing multiple compile service requests 440 using multi-threading (step 1110). A compile thread (exemplified in FIG. 6 as compile thread 625, for example) for each compile service request 440 is accessed and instructions to be compiled are received by each compile thread (steps 1115 and 1120, respectively). If the cache is active (step 1125), the time taken to export native machine instructions 450 can be decreased. For example, if the cache is active, compile server 430 performs a byte-by-byte comparison with cached compile service requests (step 1130). In another embodiment, a file comparison is used. If identical compile service request exists in cache, the corresponding cached shared object is located and obtained from cache (step 1135). This short-circuits the compilation process, avoids redundant compilations, and has the effect of decreasing the overall execution time of Java™ class file 410. If the situation arises in which an identical compile service request is found in the cache, but the corresponding shared object cannot be located, the instructions to compiled are processed as if caching were not active, or similarly, as if the identical instructions had not been found in the cache (step 1140). It should be noted that the compile service request 440 is always cached (step 1165).

When the situation is such that compile service request 440 is unique, or when caching is disabled or not otherwise used, instructions to be compiled 445 are compiled by compile server core 435 (step 1145). Compile server core 435 translates bytecodes provided by instructions to be compiled 445 into native machine instructions 450. Compile server 430 is aware of the architecture for which native machine instructions 450 are to be compiled as compile server 430 is an extension of Java™ runtime environment 425. The native machine instructions 450 are compiled to a shared object file, generated in step 1150.

In one embodiment, the instructions to be compiled are bytecodes associated with a class dynamically created by a classloader, for example classloader 515 of FIG. 5. These bytecodes are compiled using commands or tools associated with the Java™ programming language, for example njmake and jc.

Continuing with FIG. 11, should an error occur before the shared object is exported, an error string is returned to computer 405 (steps 1155 and 1160, respectively). When compilation is complete and there are no errors, the compile service request 440 is cached and the shared object file is transmitted to computer 405 (steps 1165 and 1170).

Figure 12:
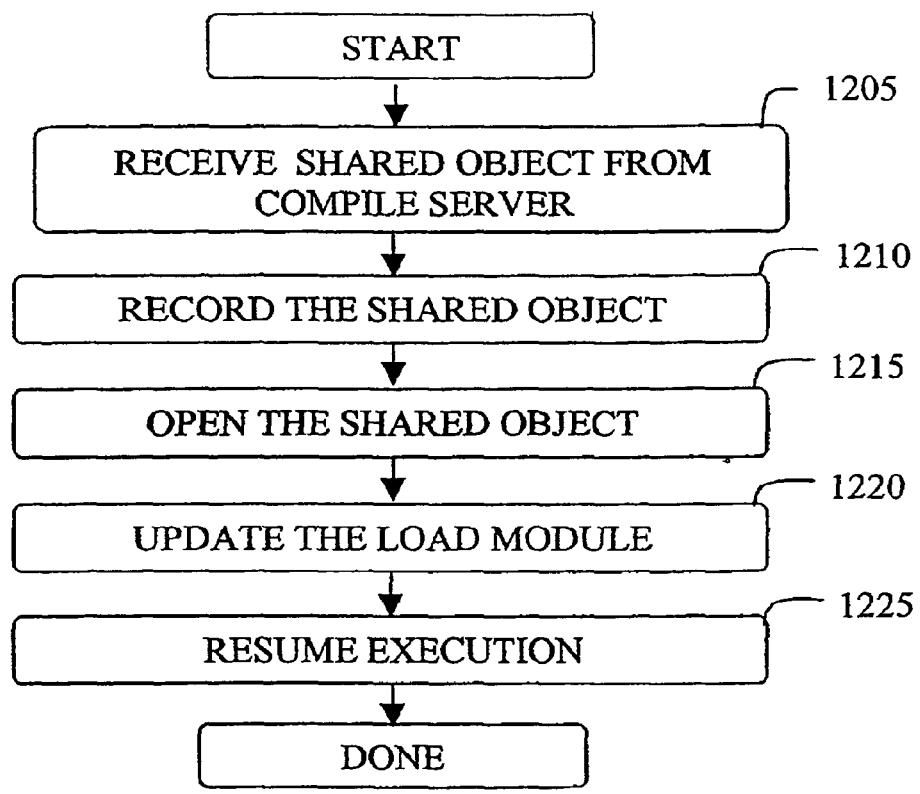
FIG. 12 illustrates the receipt of native machine instructions by Java™ runtime environment 425 of FIG. 4 according to one embodiment of the present invention.

FIG. 12 illustrates the receipt of native machine instructions 450 by Java™ runtime environment 415. Native machine instructions 450 are received as a shared object file from compile server core 435 and recorded, for example in a directory reserved for use by the Java™ runtime environment 415 (steps 1205 and 1210). Along with the shared object file, compile server 430 returns the name for the dynamically compiled new shared object. Once recorded, the shared object is opened and the load module generated during the execution of Java™ class file 410 is updated (steps 1215 and 1220, respectively). The shared object can be opened by Java™ runtime environment 415 with a command such as Sun Solaris's "diopen" command. Having updated the load module, execution of the bytecodes in Java™ class file 410 is resumed outside the wrapper class, at which time the native machine instructions 450 may be executed natively (step 1225). By returning native machine instructions 450 to Java™ runtime environment 415, rather than returning native machine instructions 44 as an executable a.out file for example, the security and integrity of native machine instructions is increased.

The processing of the shared object described in steps 1200 through 1230 above occurs during run time. During execution of the bytecodes. the need to compile dynamic constructs and dependent classes, some of which depend on data available only at run time, is recognized ahead of time. The bytecodes for dynamic constructs and dependent classes are then packaged and transmitted to compiler server 430 for compilation. Compilation of the dynamic constructs and dependent classes not only occurs during run time, but multiple compilations may be processed concurrently by compile server 430. When needed, the native machine instructions produced by the compile server 430 are executed by Java™ runtime environing 15.

Prior attempts at providing a true conforming compiler failed to compile during run time code which required run time information. The present invention overcomes the challenge of achieving the dynamic benefits of interpretation with a compiled runtime. Additionally, the present invention provides for compiling during run time a Java™ class file, including dynamic constructs (the ClassLoader.defineClass method and/or the Class.forName method for example) which may require information at run time, into native machine instructions, which are then directly executed, possibly following compiler optimization.

Figure 13:
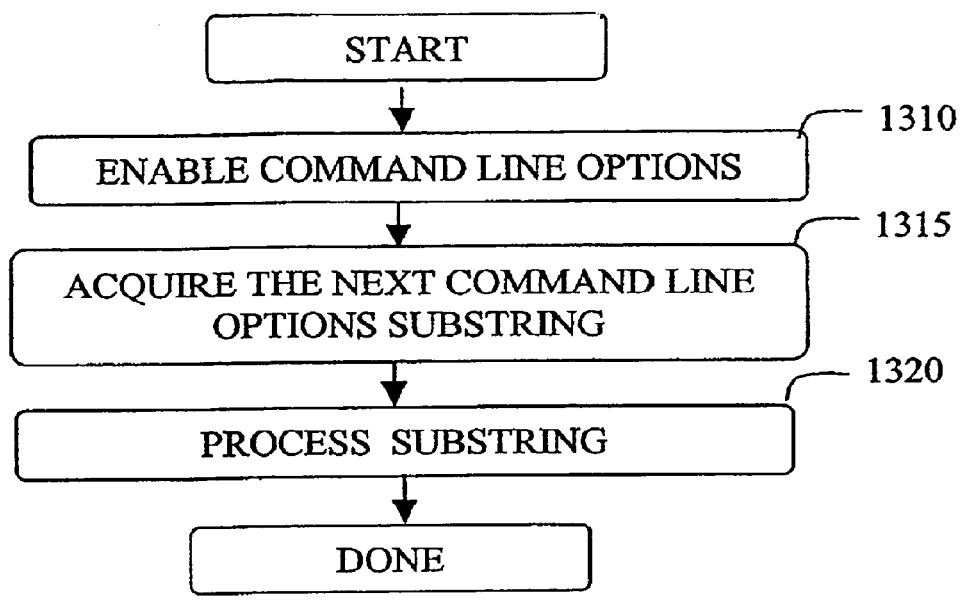
FIG. 13 illustrates the processing of command line options for a compile server according to one embodiment of the present invention.

In keeping with the flexibility of the Java™ programming language, one embodiment of the present invention provides for passing instructions from a command line to the compiler server 430. For example, to prevent use of compile sewer 430, the "JavaClassFile-Dnjcs.compileserver=– <runargs>" command is issued on the command line, where JavaClassFile is the name of the Java™ class file to be executed. FIG. 13 illustrates tasks generally performed in processing command line options. When compile server 430 is started, commands may be provided on the command line (step 1310). In fact, multiple commands may be issued, with each command acquired after the previous one (step 1315). Once acquired, the command (identified as the substring in step 1320 of FIG. 13) is passed to compile server 430 and processed.

Example substrings for compile server 430 include "-cache" for activating caching, "-help" which enumerates command line options to the display without starting the compile server, and "-version" which prints the version of the compile server. Commands for optimizing the compiler, include "jcopts -1", which sets the optimization level to -1, "jcopts -02", which sets the optimization level to -02, "jcopts -03", which sets the optimization level to -03, "jcopts -04", which sets the optimization level to -04, and "jcopts fast", which sets the optimization to -fast. Optimizing the compiler refers to the process of producing more efficient code through selection of instruction sequences. The command line options described herein, provide the selection criteria. Command line options also allow setting the log file destination to a file name specified on the command line by using the "-log file <absolute_filename>" substring or sending a complementary log file to stdout with the "-verbose" substring. It is also possible to assign a listening port number to the listening port by using the "-port <number>" substring.

Figure 14:
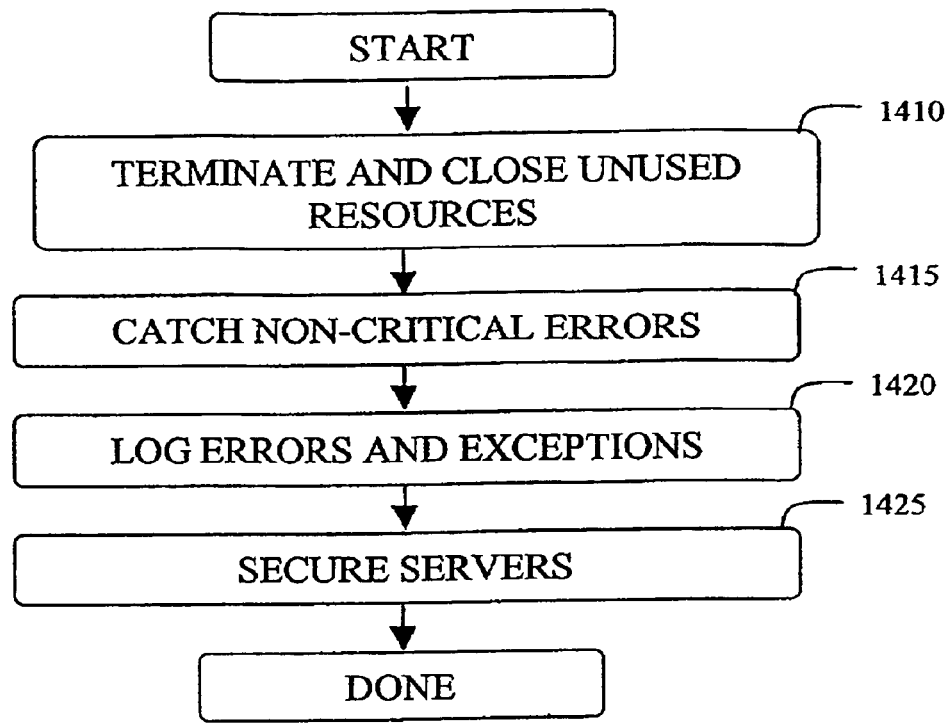
FIG. 14 illustrates general stability tasks performed by a compile server according to one embodiment of the present invention.

FIG. 14 illustrates generally the tasks that compile server 430 may perform upon final exit. These include terminating and closing unused resources (step 1410), catching noncritical errors, and cleanly exiting with a warning on critical errors and logging all errors and exceptions (steps 1415 and 1420, respectively). During the securing step 1425, the compile server is secured with mechanisms such as a firewall, protocols for logging in, and a virtual private network to prevent denial of service attacks.

Java™ Class Files Containing Dynamic Constructs

FIG. 15 shows a Java™ class called Batman which invokes Class.forName(String className), which in turn invokes ClassLoader.defineClass. As there is no literal String used for the parameter <className>, the class being invoked is determined at run time. A feature made possible by the present invention, is the inclusion of all of run time in compile time. Said another way, compile time is extended to embody run time. The transformation of compile time to include all of run time is referred to herein as "malleable compile time." Malleable compile time relaxes an artificial constraint on the traditional computer science understanding of compile time as necessarily ending before run time begins. For example, with malleable compile time, compile time may extend into run time. Additionally, for jobs and/or processes executed multiple times, the extension may go as far as the last time a job or process is executed. Further, malleable compile time enables such derivative capabilities as a "Install once, run anywhere" feature of Java™. Embodiments of the present invention thus provides innovative techniques for run time compilation of dynamic constructs which require run time information. This is done in a manner that conforms to Java™'s specifications without unallowable mechanisms such as manual intervention or external settings.

FIGS. 16 through 17 illustrate examples of class files exhibiting dependency. FIG. 16 shows that class Robin calls a static method quote( ) of class Alfred, on which class Robin depends. To provide comprehensive compilation of Java™ classes, it is not only necessary to compile dynamic constructs which require run time information, but also to determine and collect information about classes which may depend on other classes containing dynamic constructs.

While particular embodiments of the present invention have been shown and described, it will be obvious to those skilled in the art that, based upon the teachings herein, changes and modifications may be made without departing from the present invention and its broader aspects and, therefore, the appended claims are to encompass within their scope all such changes and modifications as are within the true spirit and scope of this invention.

Moreover, while the invention has been particularly shown and described with reference to these specific embodiments, it will be understood by those skilled in the art that the foregoing and other changes in the form and details may be made therein without departing from the spirit or scope of the invention. For example, the present invention should not be limited to only a traditional computer. The implementation and use of a compile server may occur on such other devices as cellular phones, personal digital assistants, and other devices capable of being connected to a network. Consequently, the scope of the invention should be determined with reference to the appended claims.

What is claimed is:

1. A method for compiling dynamic constructs during run time, comprising:
   detecting a dynamic construct during run time of a program before code within the dynamic construct is executed,
   transmitting a compile service request and instructions to be compiled from the dynamic construct across a network to a remote compile server while concurrently executing the program, wherein the instructions to be compiled are bytecode instructions;
   wherein the dynamic construct allows new source code to be added to the program during run time;
   compiling the compile service request and the instructions to be compiled within a processor of the remote compile server into a compiled code; wherein compiling the compile service request and the instructions during run time involves disabling caching;
   generating a shared object file;
   caching the compiled service request; and
   returning the shared object file;
   in response to the compile service request, receiving the compiled service request from the remote compile server; and
   integrating the compiled service request into the program so that the compiled service request can be executed; wherein integrating the compiled service request involves:
     recording the shared object file;
     opening the shared object file; and
     updating a load module that is generated during execution of the program using the shared object file;
   wherein compiling the new source code on the remote compile server provides a compile capability for systems lacking a run time compiler.

2. The method of claim 1, wherein the compile service request includes a compile command to indicate to the remote compile server that a compilation is to be performed.

3. The method of claim 1, wherein the compile service request includes a file to indicate to the remote compile server that a compilation is to be performed.

4. The method of claim 1, wherein the compile service request is integrated with instructions to be compiled.

5. The method of claim 1, wherein the remote compile server:
   compiles instructions into native machine instructions; and
   transmits the native machine instructions to the run time program for execution.

6. The method of claim 1, wherein the dynamic construct operates on information known only during run time.

7. A computer-readable storage medium storing instructions that when executed by a computer cause the computer to perform a method for compiling dynamic constructs during run time, the method comprising:
   detecting a dynamic construct during run time of a program before code within the dynamic construct is executed;
   transmitting a compile service request and instructions to be compiled from the dynamic construct across a network to a remote compile server while concurrently executing the program, wherein the instructions to be compiled are bytecode instructions;
   wherein the dynamic construct allows new source code to be added to the program during run time;
   compiling the compile service request and the instructions to be compiled within a processor of the remote compile server into a compiled service request; wherein the compiling the compile service request and instructions during run time involves disabling caching;
   generating a shared object file;
   caching the compiled service request; and
   returning the shared object file;
   in response to the compile service request, receiving the compiled service request from the remote compile server; and
   integrating the compiled service request into the program so that the compiled service request can be executed, wherein integrating the compiled service request involves:
     recording the shared object file;
     opening the shared object file; and
     updating a load module that is generated during execution of the program using the shared object file;
   wherein compiling the new source code on the remote compile server provides a compile capability for systems lacking a run time compiler.

8. The computer-readable storage medium of claim 7, wherein the compile service request includes a compile command to indicate to the remote compile server that a compilation is to be performed.

9. The computer-readable storage medium of claim 7, wherein the compile service request includes a file to indicate to the remote compile server that a compilation is to be performed.

10. The computer-readable storage medium of claim 7, wherein the compile service request is integrated with instructions to be compiled.

11. The computer-readable storage medium of claim 7, wherein the remote compile server:
compiles instructions into native machine instructions; and transmits the native machine instructions to the run time program for execution.

12. The computer-readable storage medium of claim 7, wherein the dynamic construct operates on information known only during run time.

13. An apparatus for compiling dynamic constructs during run time, comprising:
a processor;
a memory;
a detection mechanism configured to detect a dynamic construct during run time of a program before code within the dynamic construct is executed;
a transmitting mechanism configured to transmit a compile service request and instructions to be compiled from the dynamic construct across a network to a remote compile server, wherein the program is executed concurrently while the remote compile server processes the compile service request, and wherein the instructions to be compiled are bytecode instructions;
wherein the dynamic construct allows new source code to be added to the program during run time;
a compiling mechanism configured to compile the compile service request and the instructions to be compiled within a processor of the remote compile server into a compiled service request; wherein while compiling the compile service request and instructions during run time, the compiling mechanism is configured to disable caching;
a generating mechanism configured to generate a shared object file;
a caching mechanism configured to cache the compiled service request; and
a transmission mechanism configured to return the shared object file;
a receiving mechanism configured to receive the compiled service request from the remote compile server in response to the compile service request; and
an integrating mechanism configured to integrate the compiled service request into the program so that the compiled service request can be executed, wherein while integrating the compiled service request into the program, the integrating mechanism is configured to:
record the shared object file;
open the shared object file; and
update a load module generated during execution of the program using the shared object file;
wherein compiling the new source code on the remote compile server provides a compile capability for systems lacking a run time compiler.

14. The apparatus of claim 13, wherein the compile service request includes a compile command to indicate to the remote compile server that a compilation is to be performed.

15. The apparatus of claim 13, wherein the compile service request includes a file to indicate to the remote compile server that a compilation is to be performed.

16. The apparatus of claim 13, wherein the compile service request is integrated with instructions to be compiled.

17. The apparatus of claim 13, wherein the remote compile server:
compiles instructions into native machine instructions; and
transmits the native machine instructions to the run time program for execution.

18. The apparatus of claim 13, wherein the dynamic construct operates on information known only during run time.

* * * * *

UNITED STATES PATENT AND TRADEMARK OFFICE
CERTIFICATE OF CORRECTION

PATENT NO. : 7,340,730 B2
APPLICATION NO. : 10/100558
DATED : March 4, 2008
INVENTOR(S) : Thomas D. Arkwright et al.

It is certified that error appears in the above-identified patent and that said Letters Patent is hereby corrected as shown below:

(column 13, line 50), please replace the semi-colon ";" with a comma --,--.

(column 13, line 66), please delete the words "that is" so the line reads "updating a load module generated during execution".

(column 14, line 36) please replace the semi-colon ";" with a comma --,--.

Signed and Sealed this

Twenty-fourth Day of June, 2008

JON W. DUDAS
*Director of the United States Patent and Trademark Office*